Nov. 24, 1959    H. J. BLUM    2,914,101
SAW BLADE BACKSTOP
Filed Jan. 4, 1957
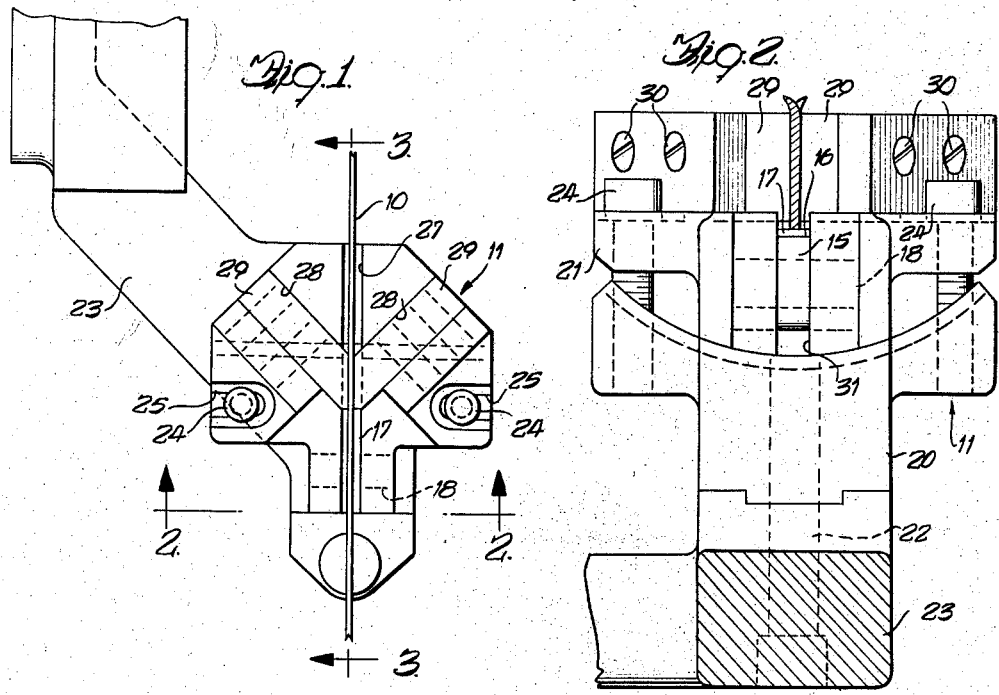
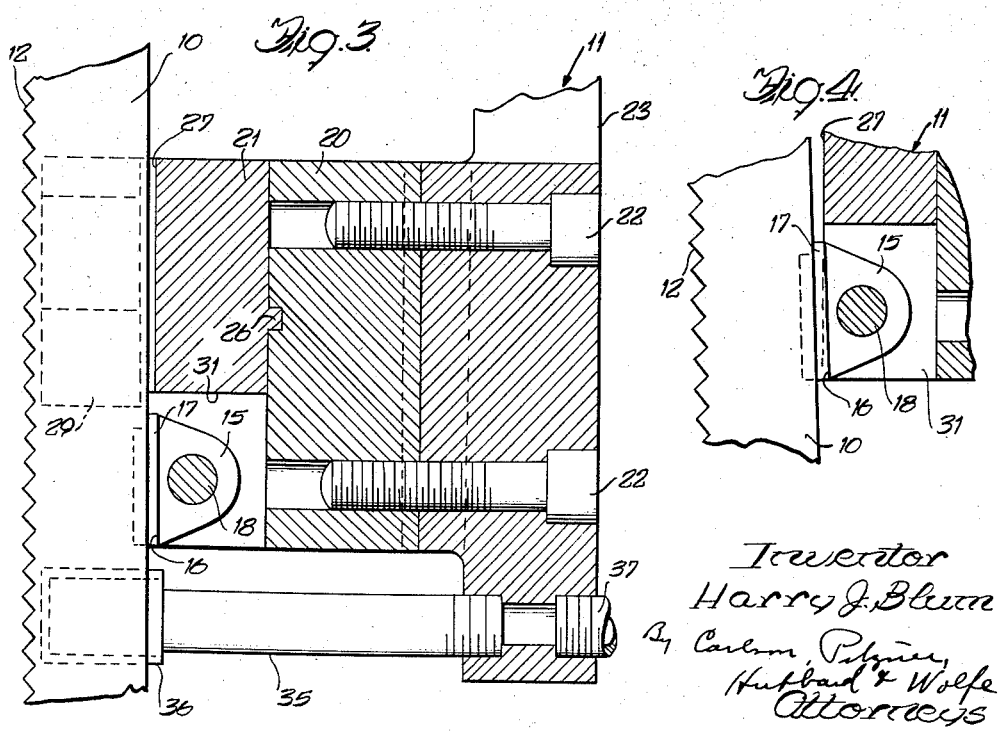
Inventor
Harry J. Blum
By Carlson, Pitzner,
Hubbard & Wolfe
Attorneys United States Patent Office 2,914,101
Patented Nov. 24, 1959

2,914,101

SAW BLADE BACKSTOP

Harry J. Blum, Chicago, Ill., assignor to Armstrong-Blum Manufacturing Company, Chicago, Ill., a corporation of Illinois Application January 4, 1957, Serial No. 632,473

2 Claims. (Cl. 143—160)

The invention relates to band saws and comparable sawing machines employing elongated narrow blades and it is more particularly concerned with an improved blade backstop for such sawing machines.

Sawing machines of the above general character are customarily provided with blade backstops positioned to engage and support the back edge of the blade at opposite sides of the work as the toothed edge of the blade is fed into the work. In the case of band saws and especially those designed for cutting metal, relatively high pressures are required to feed the blade into the work and corresponding pressures, of course, are imposed on the backstops which act to hold the blade against the work. Due to the narrow kerf cut by the saw blade, the backstop can engage the blade only in limited areas along its back edge and a section of the blade corresponding to the thickness of the work is left unsupported. While the back edge of the blade is usually comparatively smooth, nevertheless the high pressure on the backstop, particularly in the area adjacent the unsupported section of the blade, coupled with the rapid travel of the blade, tends to wear away the bearing surface very quickly. Backstops as heretofore constructed have a useful life in operation ranging from a few hours to a few days in the case of heavy duty band saws and an operational life that is only slightly longer in light duty saws.

With the above in view the primary object of the present invention is to provide a blade backstop for band saws and the like which is more resistant to wear and which has a longer useful life than backstops as heretofore constructed.

A more specific object is to provide a blade backstop for band saws embodying novel features of construction which enable it to maintain a relatively large bearing surface area in engagement with the blade at all times and particularly when the blade is pressed against a workpiece.

Other objects and advantages of the invention will become apparent from the following detailed description of the preferred embodiment illustrated in the accompanying drawings, in which Figure 1 is a front elevational view of the blade guiding structure of a metal cutting band saw equipped with a blade backstop embodying the features of the invention.

Fig. 2 is a sectional view through the guiding structure taken in a horizontal plane substantially on the line 2—2 of Fig. 1.

Fig. 3 is a sectional view taken in a vertical plane substantially on the line 3—3 of Fig. 1.

Fig. 4 is a fragmentary sectional view taken in the same plane as Fig. 3 showing the position of the backstop upon deflection or bending of the blade due to pressure against the work.

While a preferred form of the invention has been shown and will be described in detail herein, it is not intended to limit the invention to the particular embodiment shown, but the intention is to cover all modifications, adaptations and alternative constructions falling within the spirit and scope of the invention as defined in the appended claims.

For purposes of illustration the invention has been shown as incorporated in a metal cutting band saw, although it is to be understood that it may also be used to advantage in other types of sawing machines employing elongated narrow blades. The exemplary band saw has a blade 10 running through guides 11 located at opposite sides of the work. As the guides are substantially alike, only one has been shown. It will be understood that the blade 10 comprises an endless, relatively thin and narrow band of steel or other suitable metal with teeth 12 formed along one edge. As is customary in band saws the blade runs over a pair of pulleys or wheels suitably spaced apart, one of which is rotated by a motor to drive the blade.

In a sawing operation, the blade 10 is fed edgewise to the workpiece with its toothed edge engaging the work to produce the cutting action. The feed may be effected by movement of the blade toward the workpiece or by movement of the workpiece towards the blade as desired. In either case rigid backing for the blade is required to counteract the pressure on the toothed edge and to hold it in cutting relation to the workpiece.

The kerf cut by the blade 10 is too narrow to accommodate abutments or other backing means directly back of the cutting portion of the blade. It is therefore the usual practice to provide two abutments or backstops disposed at opposite sides of the work. The section of the blade in actual engagement with the work is therefore left unsupported. In metal cutting band saws the pressure on the blade is sufficient to deflect or bend back the unsupported section a slight amount, thus concentrating pressure on the edge of the backstop adjacent the workpiece.

In accordance with the present invention the backstop is constructed and supported in a manner such that it presents at all times a hard bearing surface of substantial area in engagement with the back edge of the blade. In particular the backstop is mounted so that a long bearing surface is maintained in supporting engagement with the blade through the entire length of the surface even when the adjacent unsupported blade section is bent back or deflected by the pressure of the work. Pressure of the blade per unit area of the bearing surface is thus minimized and excessive localized wear as, for example, at the edge of the bearing surface next the work, is effectually avoided. The useful life of the backstop is thus materially increased and idle machine time required for changing backstops is substantially eliminated.

In its preferred form, the improved backstop comprises a metal block 15 of suitable material presenting at one side an elongated rectangular face 16 substantially wider than the thickness of the blade 10. In the particular embodiment illustrated, the length of the face 16 is approximately four times its width. While the rectangular face of the block 15 may be finished with a flat smooth surface suitably hardened to resist wear, it is preferred to provide the block with an auxiliary wear resisting facing 17 such as cemented hard carbide. Tungsten carbide in the form of a flat rectangular slab or bar brazed or otherwise permanently secured to the face 16 of the block 15 has been found eminently suitable. It will be understood, of course, that the outer or bearing surface of the facing 17 is given a flat smooth finish.

Provision is made for supporting the backstop block 15 on a rigid portion of the machine structure with the facing 17 disposed longitudinally of the blade 10 substantially parallel to its back edge and in a position to engage and support the edge of the blade. To accommodate irregularities in the running of the blade and to compensate for the deflection or bending of the unsupported blade section in operation, the support for the backstop includes means permitting limited rocking movement about an axis transverse to the back edge of the blade. This means may conveniently comprise a pivot pin 18 extending transversely through the block 15 and having its opposite ends engaged in suitable apertures in the machine structure. Thus mounted, the block may rock through an angle sufficient to maintain contact through the entire length of the bearing facing 17 with the back edge of the blade when the blade is running true as shown in Fig. 3, or when it is bent or deflected as shown in exaggerated form in Fig. 4.

In the particular embodiment illustrated, the backstop 15 is incorporated in the guide 11, it being understood that such a guide is provided at each side of the workpiece. The guide 11 shown includes a heavy metal base comprising front and rear sections 20 and 21. The rear section 20 is secured as by screws 22 to a bracket 23 rigidly mounted on the machine structure. To provide for angular adjustment transversely of the blade for proper guidance of the blade, the base sections 20 and 21 are formed with arcuate mating surfaces and are secured together by screws 24 passing through slots 25 (Fig. 1) in the front section and threading into the ring section. A rib or spline 26 on the front section engages in a complemental groove in the rear section to restrain the sections against the undesirable axial movement.

In the exemplary band sawing machine, the bracket 23 is secured to a suitable part of the machine structure in a position to present the front face of the base section 21 at the back of the saw blade 10. In practice the bracket is adjustably mounted for movement longitudinally of the blade so that the guide may be located close to a workpiece of any thickness within the capacity of the machine.

As will be seen by reference to Figs. 1 and 3 of the drawings, the base section 21 has a slot or groove 27 in its front face defining a passage for the accommodation of the blade 10. Intersecting this slot at opposite sides are a pair of inclined grooves 28 (Fig. 1) within which are mounted guide bars 29 of hard material such as cemented hard carbide, having their ends suitably beveled for direct guiding engagement with the sides of the blade 10. Means such as screws 30 are provided for rigidly locking the guide bars in their grooves.

For convenience in mounting the backstop 15, the base section 21 is formed at its lower end with a recess 31 dimensioned to receive the backstop 15. The recess is alined with the guide slot 27 and preferably located immediately adjacent the passage defined by the guide bars 29. Apertures provided in the base section for insertion of the pivot pin 18 are located so that upon assembly the bearing surface of the facing 17 of the backstop is disposed outwardly with respect to the bottom of the slot 27. The saw blade accordingly rides on the bearing surface and is held clear of the bottom of the slot. Moreover, the guide bars 29 are enabled to hold the blade edge flat against the bearing surface.

In the blade guide structure illustrated, provision is made for supplying coolant to the blade at a point between the backstop 15 and the workpiece. For this purpose the bracket 22 supports a forwardly projecting nipple 35 terminating in a nozzle 36 slotted to afford passage for the blade. Liquid coolant is supplied to the nipple and nozzle from any suitable source through a supply pipe 37.

It will be apparent from the foregoing that the invention provides a blade backstop of novel and improved construction particularly suitable for use with heavy duty metal cutting band saws and comparable sawing machines employing elongated narrow blades. By reason of its novel construction and mounting, the improved backstop has an extraordinarily long useful life in operation. In actual use backstops constructed in accordance with the invention have remained in satisfactory operating condition for months as compared to a life of several hours, or at most, a few days, for conventional backstops. This result is attained by constructing the backstop so as to present a bearing surface of relatively large area for the back edge of the blade to ride on as it is pressed against the workpiece. The accurate guidance of the blade by the hardened guide bars engaging the sides of the blade adjacent the backstop assists by maintaining the blade edge flat against the bearing surface. Of particular importance is the mounting of the backstop so that it is permitted to rock about an axis perpendicular to the back edge of the blade and through an angle sufficient to maintain contact between the blade and bearing surface through the entire length of the surface whether or not the blade is running true. In particular, the extensive bearing contact is maintained even when the unsupported section of the blade is deflected or bent back by the pressure against the work. Facing the backstop with hard, wear resisting material such as cemented hard carbides, further increases its useful life which in any case is many times longer than the life of backstops as heretofore constructed.

I claim as my invention:

1. The combination with a band saw blade adapted to have its toothed edge pressed against a workpiece with substantial pressure, a bracket supporting a rigid metal base with its front face adjacent the back edge of the blade, means on the base supporting a pair of guide bars in position to define a narrow passage for the accommodation of the blade, said base having a recess in its front face located between said passage and the workpiece and in alignment with the passage, a backstop comprising a metal block having on one side a facing of cemented hard carbide defining an elongated flat bearing surface, and a pivot pin supporting said block on said base within said recess with said surface positioned forwardly of the front face of the base for contact with the back edge of the blade, said pin permitting said block to pivot about an axis transverse to the edge of the blade so as to maintain contact with the blade throughout its entire length as the blade is deflected from the vertical incident to its being pressed against the workpiece.

2. The combination with a band saw blade adapted to have its toothed edge pressed against a workpiece with substantial pressure, a bracket supporting a rigid metal base with its front face adjacent the back edge of the blade, said base having a recess in vertical alinement with the blade, a backstop supported in said recess with one side defining an elongated flat hardened bearing surface for engagement by the back edge of the blade, a pair of hardened guide bars supported on said base adjacent one end of said recess with their ends engaging opposite sides of the blade operative to maintain the blade edge flat against said bearing surface, the support for said backstop including a pivot pin received in apertures in said backstop and in said base positioned to locate the bearing surface forwardly of the face of said base, said pivot pin constraining said backstop to rock about an axis transverse to the edge of the blade so as to maintain contact between the blade edge and the bearing surface throughout the entire length of the surface as the blade is deflected incident to being pressed against the workpiece.

References Cited in the file of this patent

UNITED STATES PATENTS 2,261,816   Williams _____ Nov. 4, 1941

FOREIGN PATENTS 317,021   Switzerland _____ Dec. 16, 1956